Oct. 12, 1971 — Y. M. FEHLAU — 3,611,720
INTERNAL COMBUSTION TURBINE ENGINE
Filed Sept. 26, 1969 — 2 Sheets-Sheet 1

INVENTOR
YNGURD M. FEHLAU

BY
ATTORNEYS

Oct. 12, 1971    Y. M. FEHLAU    3,611,720
INTERNAL COMBUSTION TURBINE ENGINE
Filed Sept. 26, 1969    2 Sheets-Sheet 2
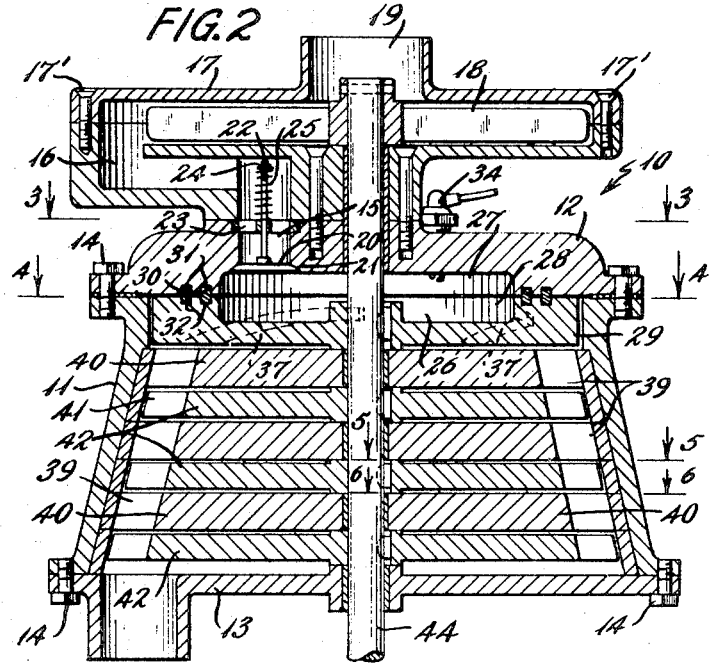
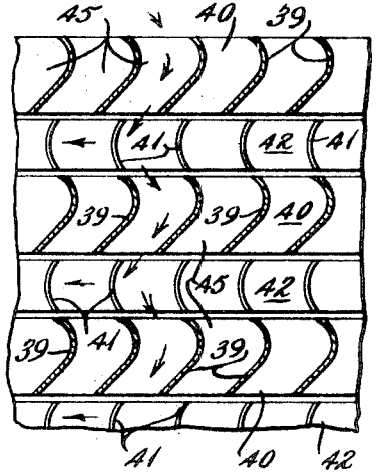
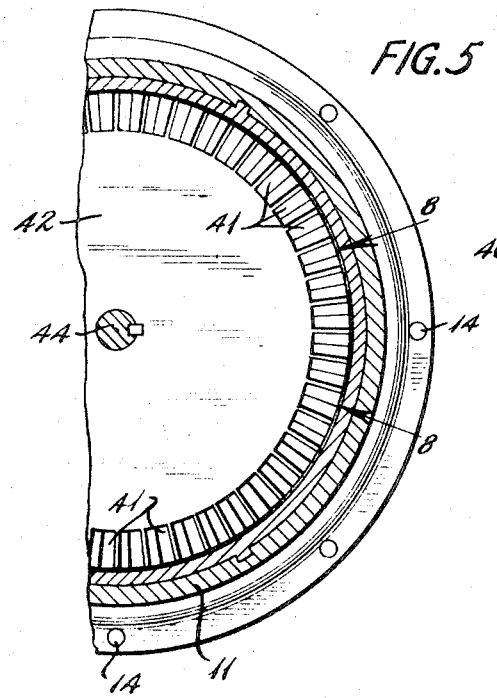
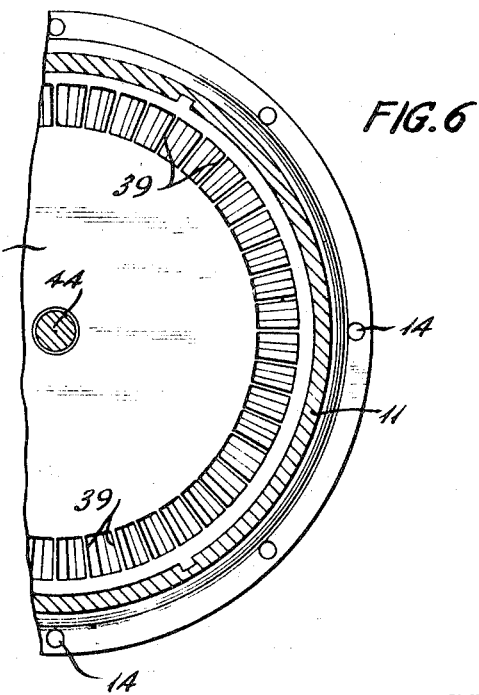
INVENTOR
YNGURD M. FEHLAU

United States Patent Office 3,611,720
Patented Oct. 12, 1971

3,611,720
INTERNAL COMBUSTION TURBINE ENGINE
Yngurd M. Fehlau, 154 S. Brunswick St.,
Old Town, Maine 04468
Filed Sept. 26, 1969, Ser. No. 861,273
Int. Cl. F02c 3/16
U.S. Cl. 60—39.34                                   5 Claims

ABSTRACT OF THE DISCLOSURE

An internal combustion turbine engine or reaction engine having a fixed and a rotary member, each with a relatively large shallow cavity facing the other transversely of a short axis combustion chamber substantially centrally divided transversely of its axis into which a pump supplies air under pressure through a one-way valve and into which fuel is injected and the expanded pressurized fluid is ignited by heat supplied through a plug and the explosive mixture channeled through curved passageways for jet action and against the vanes of alternate turbine and counter wheels to cause the rotary member of the combustion chamber to rotate by the action or driving force of the flow of the products of combustion and to impart rotation to a shaft to which such rotary member is secured.

BACKGROUND OF THE INVENTION (1) Field of the invention

The invention is in the field of prime movers, engines, or machines which receive and modify force, as from a fuel, and convert the same into driving force such as used in a turbine engine.

(2) Description of the prior art

Prime movers or engines of various kinds, including both reciprocating and rotary, have been produced operated by steam, by gas, and the like. Those operated by steam, such as steam turbines, are cumbersome, while those operated by gas are wasteful because of the fact that the explosive force is not confined until after the explosive potential is exhausted. Engines have been produced having turbine wheels driven by the combustion of explosive fuel. In such prior devices the combustion chamber consisting of a relatively large, heavy mass was rotated, or the combustion chamber was on the exterior and consequently remote so that there was no efficient way of scavenging.

SUMMARY OF THE INVENTION AND OBJECTS

The present invention comprises a relatively flat combustion chamber centrally split flatwise or transversely to the axis and half stationary and half rotatable for rotating a shaft having turbine wheels keyed thereto against which the expanded gases are directed to produce rotation of such wheels and shaft. The combustion chamber is annular or generally circular around the shaft and is supplied through a one-way intake valve with compressed air by an air pump also keyed onto the shaft. Into such compressed air within the combustion chamber, fuel is injected and the mixture under pressure is ignited by a glow plug or spark plug. The rapidly expanded combustion gases of the burning mixture are discharged through a series of passageways equally distributed in the rotatable portion of said combustion chamber around the shaft and against the turbine wheels.

It is an object of the invention to provide a lightweight simple practical and efficient internal combustion reaction engine or turbine having a multiple-part side-by-side combustion chamber with one part rotatable by the force resulting from the explosion and combustion of the fuel mixture ignited by a plug and rotating a shaft by such discharge of the rapidly expanding gases from the combustion chamber.

BRIEF DESCRIPTION OF THE DRAWINGS

FIG. 2 is a section on the line 2—2 of FIG. 1.
FIG. 5 is a section on the line 5—5 of FIG. 2.
FIG. 6 is a section on the line 6—6 of FIG. 2.
FIG. 8 is an enlarged fragmentary section on the line 8—8 of FIG. 5.

DESCRIPTION OF THE PREFERRED EMBODIMENT

Figure 1:
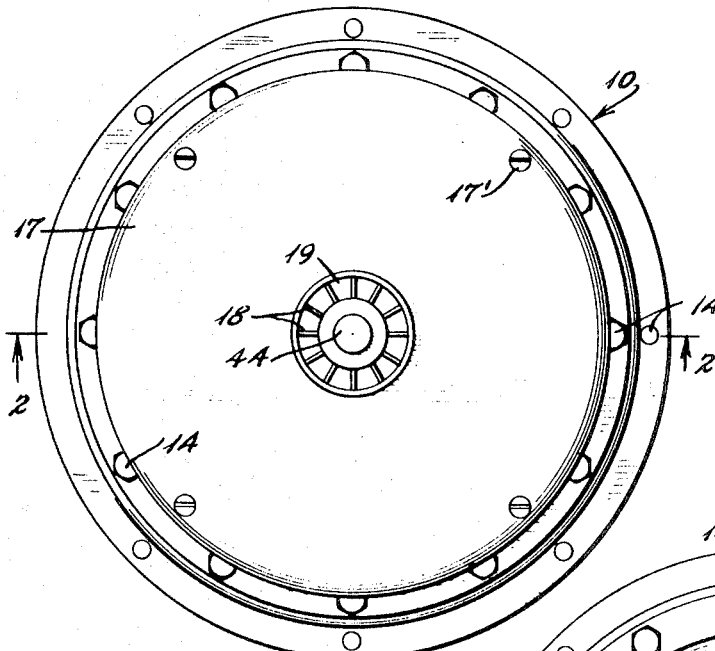
FIG. 1 is a top plan view of the internal combustion turbine of the present invention.
Figure 7:
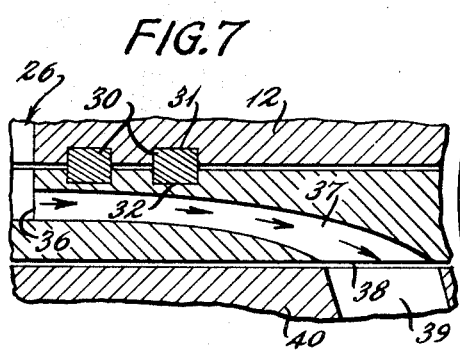
FIG. 7 is an enlarged fragmentary section on the line 7—7 of FIG. 4.
Figure 3:
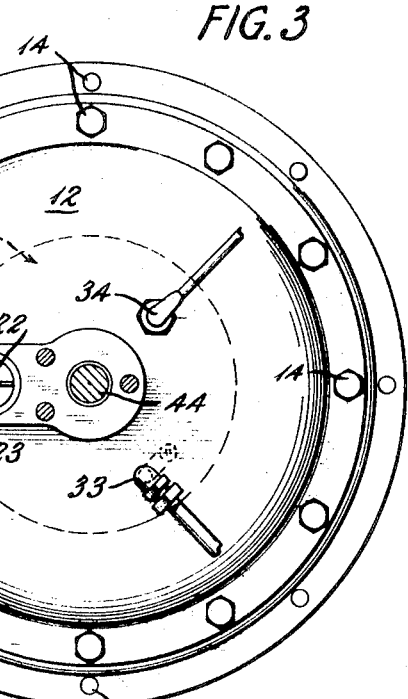
FIG. 3 is a section on the line 3—3 of FIG. 2.
Figure 4:
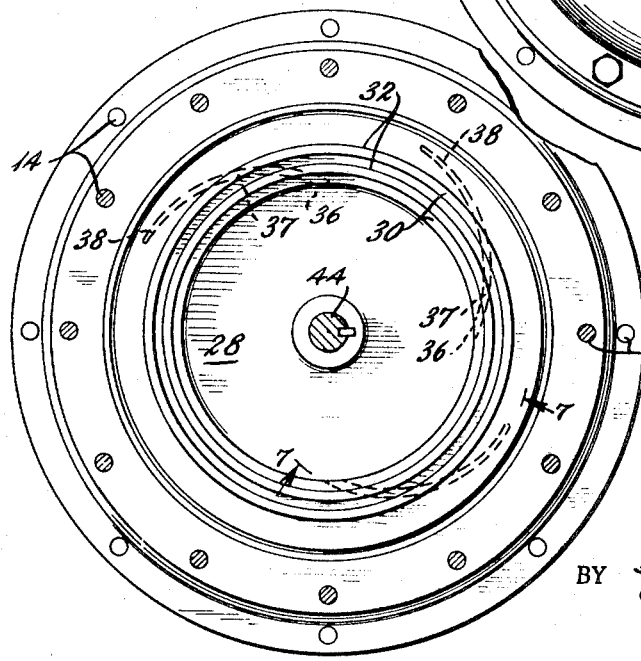
FIG. 4 is a section on the line 4—4 of FIG. 2.

With continued reference to the drawings, a power plant 10 is provided having a body 11 of a generally frustoconical configuration and having a head 12 at one end and an end plate 13 at the opposite end. The head 12 and the end plate 13 are connected to the body 11 in any desired manner, as by bolts 14.

The head 12 is provided with an opening 15 located generally in alignment with the outlet 16 from a two-part pump casing 17 held together by screws 17' having an impeller 18 adapted to force air under pressure through the outlet 16. The pump casing 17 has an inlet 19 through which air enters the pump and is compressed by the impeller 18 when the latter is rotated. A one-way valve 20 normally engages a valve seat 21 in the head 12 and such valve has a stem 22 slidably supported by a spider 23 within the opening 15. The stem 22 extends through the spider and terminates in a cap 24 between which and the spider 23 is confined. A spring 25 encircling the stem 22 and urging the valve 20 into intimate engagement with the valve seat 21 is provided. As air pressure within the pump builds up, such pressure will force the valve 20 from its seat and discharge air under pressure into a combustion chamber 26. Such combustion chamber is defined partially by a recess 27 in the lower surface of the head 12 and partially by a cooperating recess 28 in the upper surface of the driving wheel 29. Multiple seal rings 30 are located in grooves 31 in the head 12 and grooves 32 in the driving wheel 29 to confine the explosive combustion to the combustion chamber 26.

A fuel injector 33 extends through the head 12 and is adapted to inject atomized fuel under pressure into the combustion chamber 26.

The driving wheel 29 is provided with a plurality of ports 36 connected to expansion nozzles 37 which curve outwardly and downwardly in a compound curve and discharge gases through the ports 38 located in the bottom surface of the driving wheel 29. The ports 36 are slightly smaller than the discharge ports 38 and the expansion nozzles 37 taper gently from a relatively small cross-sectional configuration at the inlet ports 36 to a relatively larger cross-section configuration at the outlet ports 38 to produce a jet reaction effect for driving the wheel 29. When an explosion occurs within the combustion chamber 26 due to the atomized fuel being ignited by the spark plug 34, the rapidly expanding gases are forced through the inlet ports 36 under pressure and due to the jet reaction effect the velocity of such gases will be increased substantially. When the gases are discharged from the discharge port 38, such gases will strike vanes 39 on one face of a fixed turbine member 40 and will cause a reaction within the driving wheel 29 to produce rotation of such driving wheel 29. The driving wheel is mounted on and keyed to a shaft 44 which extends through the head 12 and the end plate 13. One end of the shaft is keyed to the impeller 18 of the rotary pump, which supplies compressed air to the combustion chamber and to the driving wheel 29 which forms half of the combustion chamber. The driving wheel 29 and shaft 44, to which it is keyed, are caused to rotate by the reaction of the explosion through the ports 36 and 38 and expansion nozzles 37 and against the vanes 39 of the fixed turbine member 40.

The unspent gas passes through openings 45 and against vanes 41 on the opposite face of the fixed turbine member 40 and impart rotary force against a driven turbine member 42. If desired additional fixed turbine members 40 and driven turbine members 42 may be employed. It will be understood that the engine of the present invention may be utilized for driving any desired mechanism for performing work.

It will be understood from the foregoing that an internal combustion engine of the tubine or reaction type and of small mass is provided having an annular generally flat combustion chamber formed of cooperating members, each having a shallow chamber and with one of the cooperating members fixed and containing a bearing for the rotary shaft of the engine, and the other keyed to and rotatable with said shaft. Thus there is no reversal of motion as with a reciprocating or piston and cylinder type engine and the force of the combustion is between the fixed and rotatively movable portions of the combustion chamber thus cutting in half, or at least reducing, energy loss over that where the two opposed members are both fixed.

What is claimed is:
1. A turbine type power plant comprising a housing including a generally cylindrical body with a head removably mounted on one end thereof, a shaft rotatably mounted axially of said housing and extending through said head, a drive wheel fixed to said shaft adjacent to said head, rotary seal means sealing said drive wheel to said head, said drive wheel having a recess disposed adjacent to said head and forming a combustion chamber with said head, pump means for introducing air under pressure into said combustion chamber, means for injecting combustible fuel into said chamber at timed intervals for mixing with the air under pressure within said chamber to form a combustible mixture, means for igniting the combustible mixture, a plurality of downwardly and outwardly curved expansion nozzle means in said drive wheel, each of said expansion nozzle means having a relatively small inlet port communicating with said recess and a larger exhaust port at the surface of said drive wheel opposite the recess, a plurality of spaced counter wheels fixed to said body and disposed alternately with said turbine wheels, and said expansion nozzle means adapted to discharge expanding gases from said combustion chamber directly against said turbine wheels and said counter wheels to cause rotation of said shaft.

2. The structure of claim 1 in which said pump means is drivingly mounted on said shaft exteriorly of said head.

3. The structure of claim 1 including a pressure operated one-way valve in said head through which air under pressure is introduced into the combustion chamber.

4. The structure of claim 1 including a recess in said head adjacent to said drive wheel and cooperating with the recess in the drive wheel to form the combustion chamber.

5. In a turbine type power plant having a housing with a shaft axially rotatably mounted therein, a plurality of spaced turbine wheels fixed to said shaft within said housing, a plurality of spaced counter wheels fixed to said housing and disposed alternately with said turbine wheels, each of said turbine wheels and counter wheels having a plurality of vanes substantially in axial alignment with the vanes of adjacent wheels, a combustion chamber within said housing, means for introducing air under pressure into said chamber, means for injecting combustible fuel into said chamber at timed intervals to combine with said air and form a combustible mixture, and means for igniting said mixture; the improvement comprising said housing having a generally cylindrical body with a head removably mounted on one end, a drive wheel fixed to said shaft intermediate said head and said turbine wheels, said drive wheel having a recess in the surface adjacent to said head and defining therewith said combustion chamber, seal means surrounding said combustion chamber and sealing said drive wheel to said head, a plurality of downwardly and outwardly curved expansion nozzle means in said drive wheel, each of said expansion nozzle means including a relatively small inlet port communicating with said combustion chamber and a larger exhaust port substantially in alignment with the vanes of said turbine wheels, whereby rapidly expanding gases from said combustion chamber will pass through said expansion nozzle means and create a jet reaction effect therein and such rapidly expanding gases will be discharged from said expansion nozzle means directly against the vanes of said turbine wheels and said counter wheels to drive said shaft.

References Cited
UNITED STATES PATENTS

| | | | |
|---|---|---|---|
| 2,479,143 | 8/1949 | Traylor | 60—39.66 |
| 2,648,492 | 8/1953 | Stalker | 60—39.36 |
| 2,933,287 | 4/1960 | Caddell | 415—81 |
| 3,130,545 | 4/1964 | Schlumbohm | 60—39.35 |

FOREIGN PATENTS

| | | | |
|---|---|---|---|
| 590,634 | 7/1947 | Great Britain | 60—39.36 |

BENJAMIN W. WYCHE, Primary Examiner

W. E. OLSEN, Assistant Examiner

U.S. Cl. X.R.

60—39.36, 39.75